(12) United States Patent
Doi et al.

(10) Patent No.: US 9,987,704 B2
(45) Date of Patent: Jun. 5, 2018

(54) METHOD FOR MANUFACTURING AN INTEGRATED MEMBER AND AN INTEGRATED MEMBER

(71) Applicant: KABUSHIKI KAISHA F.C.C., Hamamatsu-shi, Shizuoka (JP)

(72) Inventors: Yasuyuki Doi, Hamamatsu (JP); Yoshiyuki Mochizuki, Hamamatsu (JP); Keisuke Suzuki, Hamamatsu (JP)

(73) Assignee: KABUSHIKI KAISHA F.C.C., Hamamatsu-shi (JP)

( * ) Notice: Subject to any disclaimer, the term of this patent is extended or adjusted under 35 U.S.C. 154(b) by 581 days.

(21) Appl. No.: 14/720,313

(22) Filed: May 22, 2015

(65) Prior Publication Data

US 2015/0251269 A1 Sep. 10, 2015

Related U.S. Application Data

(63) Continuation of application No. PCT/JP2013/080462, filed on Nov. 11, 2013.

(30) Foreign Application Priority Data

Nov. 22, 2012 (JP) ................. 2012-255775

(51) Int. Cl.
*B23K 11/20* (2006.01)
*C22C 21/02* (2006.01)
(Continued)

(52) U.S. Cl.
CPC .............. *B23K 11/20* (2013.01); *B23K 11/02* (2013.01); *C22C 21/02* (2013.01); *B23K 2203/20* (2013.01); *Y10T 403/478* (2015.01)

(58) Field of Classification Search
CPC ........ B23K 20/02; B23K 11/20; B23K 11/02; Y10T 403/478; C22C 21/02
See application file for complete search history.

(56) References Cited

U.S. PATENT DOCUMENTS 5,254,836 A * 10/1993 Okada .................. B23K 35/308
219/146.1
5,603,853 A * 2/1997 Mombo-Caristan . B23K 15/006
219/121.14
(Continued)

FOREIGN PATENT DOCUMENTS

JP S62-084882 4/1987
JP 63-104790 A 5/1988
(Continued)

OTHER PUBLICATIONS

International Search Report dated Jan. 10, 2014 for PCT Application No. PCT/JP2013/080462, filed on Nov. 11, 2013.

*Primary Examiner* — Daniel J Wiley
(74) *Attorney, Agent, or Firm* — Knobbe, Martens, Olson & Bear, LLP

(57) ABSTRACT

A method for manufacturing an integrated member and an integrated member manufactured by the method which can improve the joining strength and reduce the manufacturing cost. A method for manufacturing an integrated member by welding a first member formed of aluminum alloy material and a second member formed of ferrous-based material characterized in that the first member contains a predetermined amount of silicon and has a thickness larger than that of the second member. The second member can be pressed against the first member along the thickness direction, and by electrically energizing the pressed-in portion during the pressing period, electric resistance welding can be used. The pressing-in amount is set to a value larger than the thickness of the second member and less than that of the first member. The overlapping margin of the first and second members is set to a value of 0.5 mm or more.

20 Claims, 5 Drawing Sheets

(51) Int. Cl.
*B23K 11/02* (2006.01)
*B23K 103/20* (2006.01)

(56) References Cited

U.S. PATENT DOCUMENTS

| | | | | |
|---|---|---|---|---|
| 5,615,826 A | * | 4/1997 | Dixon | B23K 9/173 219/121.14 |
| 6,221,505 B1 | * | 4/2001 | Shirai | B23K 26/28 228/153 |
| 6,440,583 B1 | * | 8/2002 | Ueno | B23K 35/286 148/439 |
| 2005/0087582 A1 | * | 4/2005 | Van Aken | B23K 20/122 228/112.1 |
| 2011/0240715 A1 | * | 10/2011 | Rebak | B23K 35/304 228/101 |
| 2013/0070428 A1 | * | 3/2013 | Kangastupa | H01L 23/562 361/746 |
| 2015/0053655 A1 | * | 2/2015 | Sigler | B23K 11/20 219/91.22 |

FOREIGN PATENT DOCUMENTS

| | | |
|---|---|---|
| JP | S64-42781 | 3/1989 |
| JP | 7-34965 A | 2/1995 |
| JP | 8-218937 A | 8/1996 |
| JP | 8-270499 A | 10/1996 |
| JP | H08-300167 | 11/1996 |
| JP | 9-239566 A | 9/1997 |
| JP | 2001-175074 A | 6/2001 |
| JP | 2002-035955 | 2/2002 |
| JP | 2002-307237 A | 10/2002 |
| JP | 2004-138209 A | 5/2004 |
| JP | 2006-263809 | 10/2006 |
| JP | 2009-274468 A | 11/2009 |
| JP | 2012-61493 A | 3/2012 |

* cited by examiner

[ Fig 1 ]
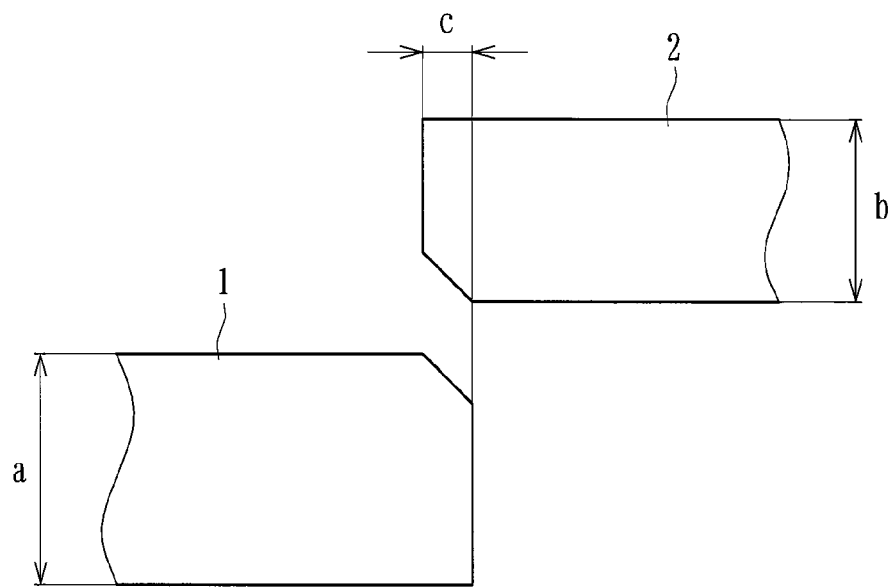
[ Fig 2 ]
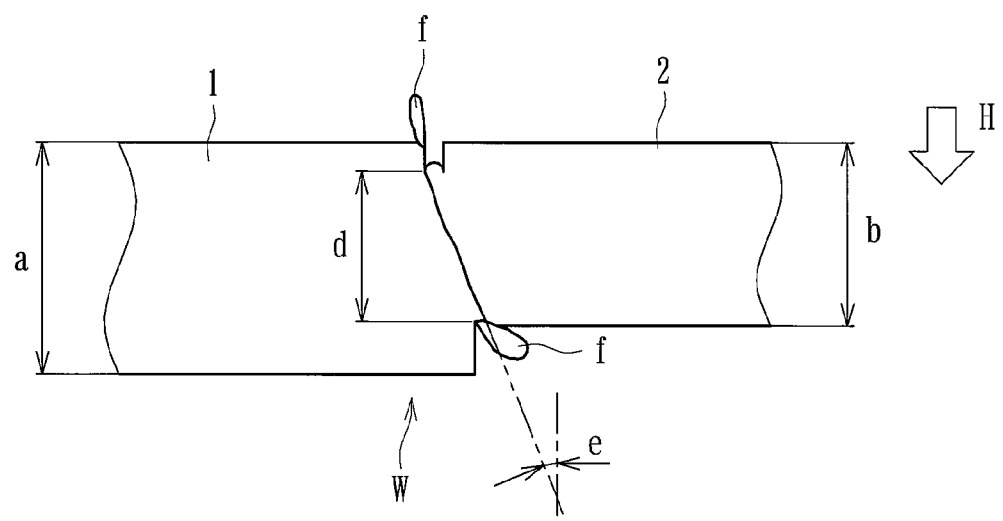

[ Fig 2a ]
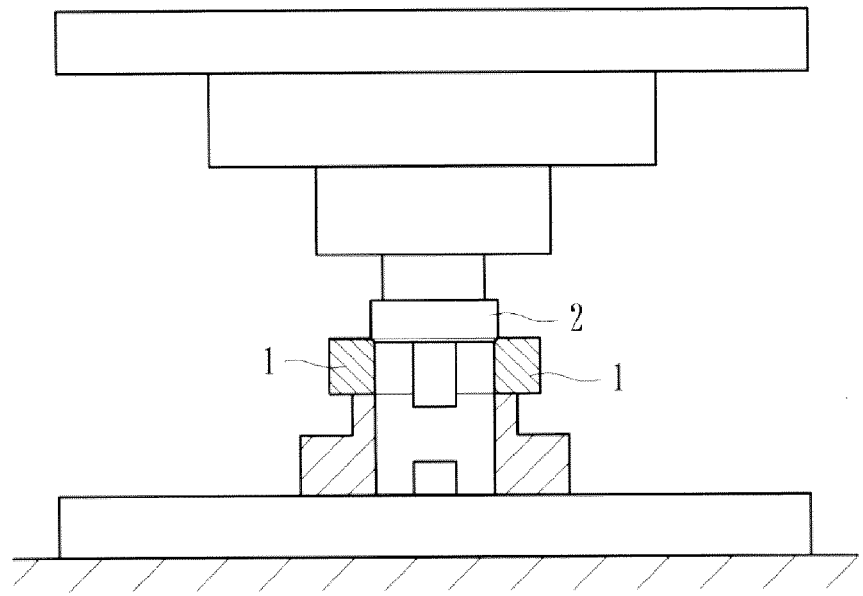
[ Fig 2b ]
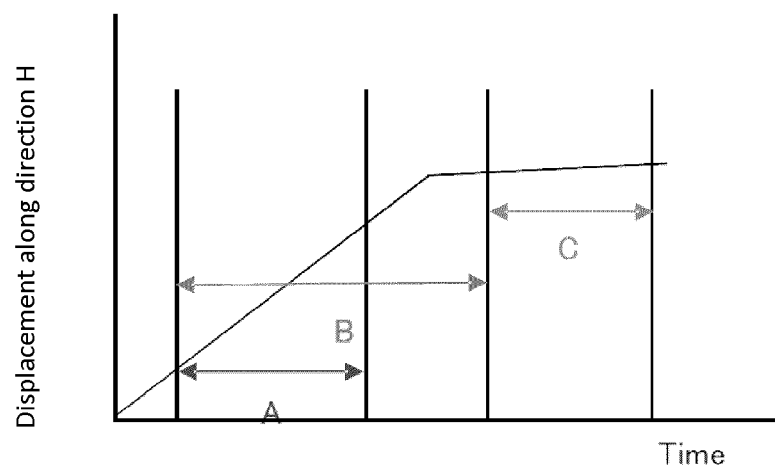

[Fig 3]
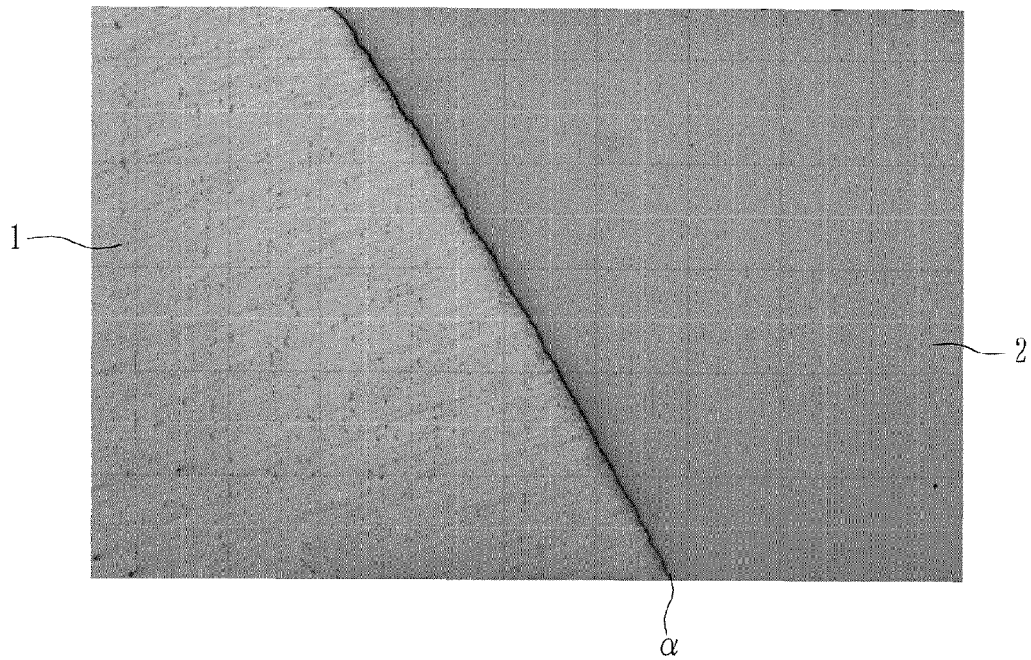
[Fig 4]
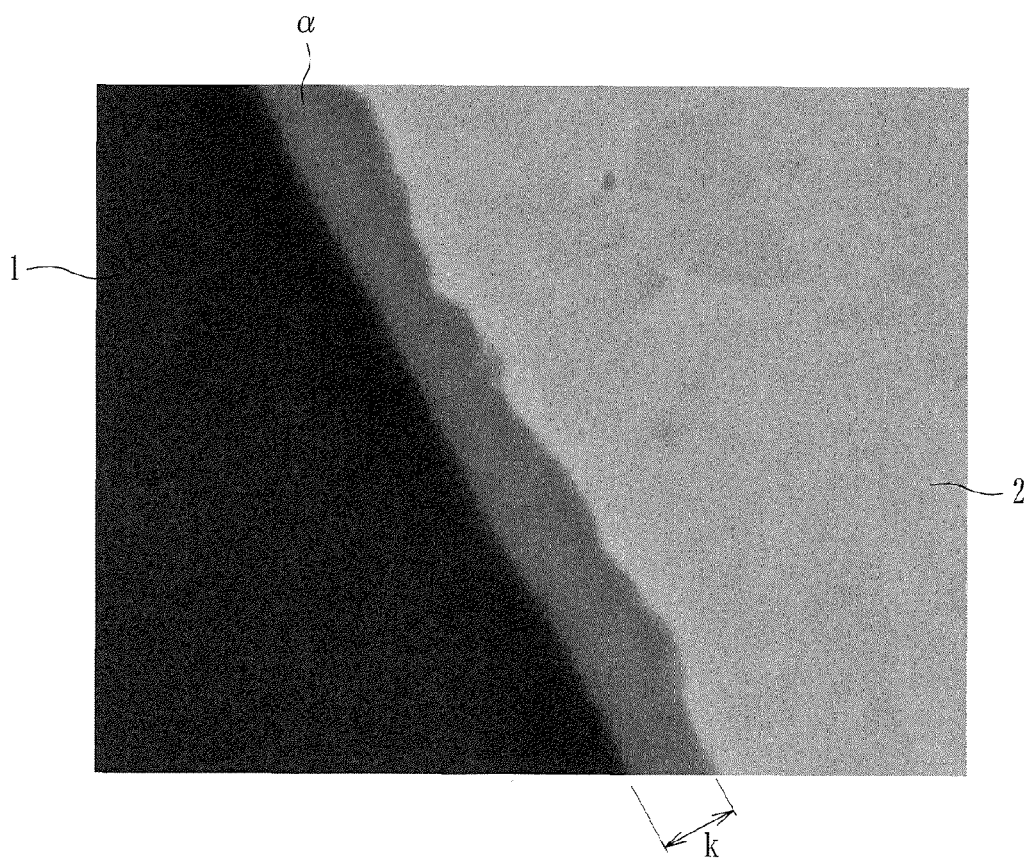

[Fig 5]
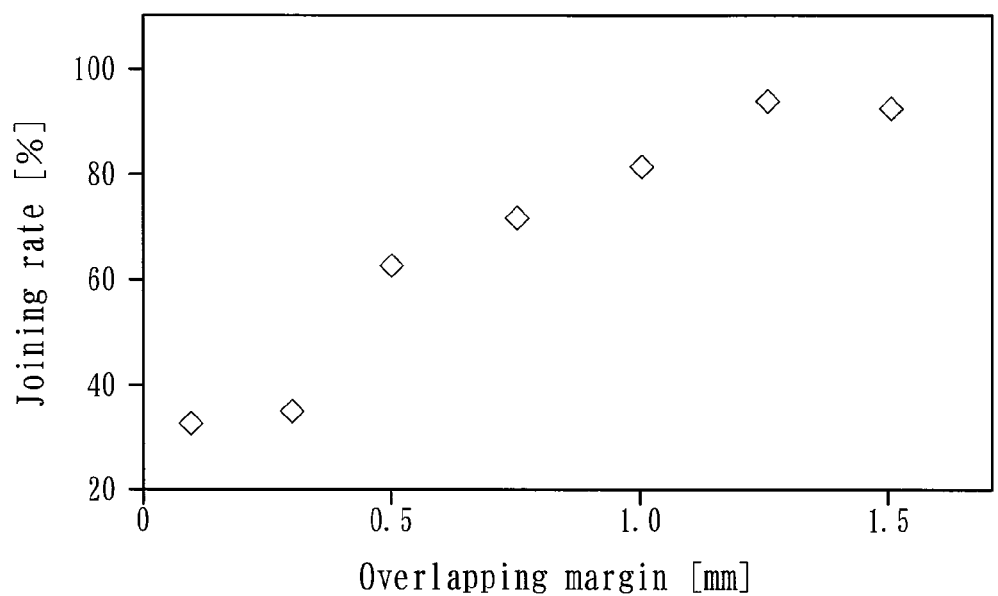
[Fig 6]
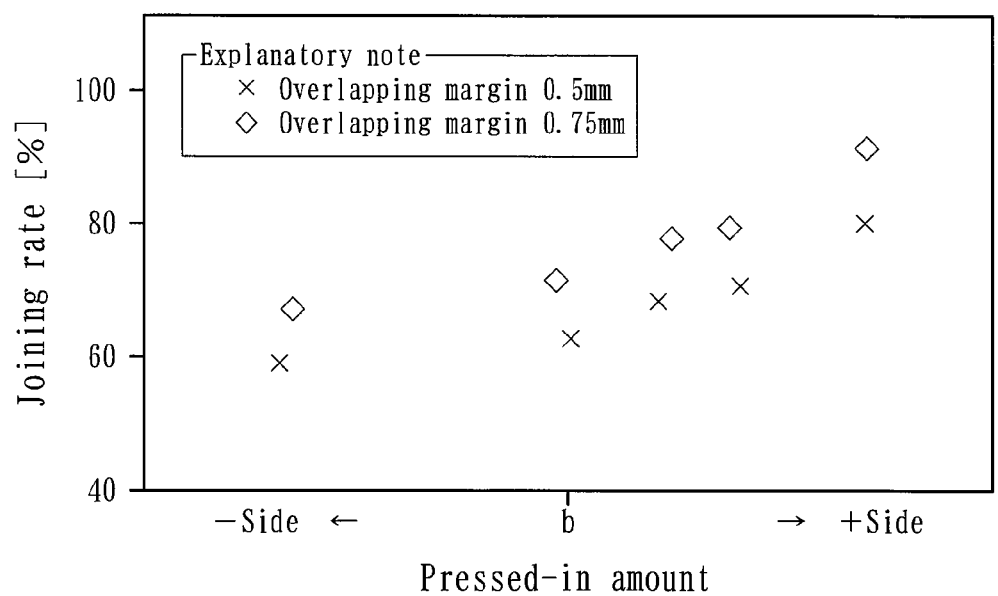

[Fig 7]
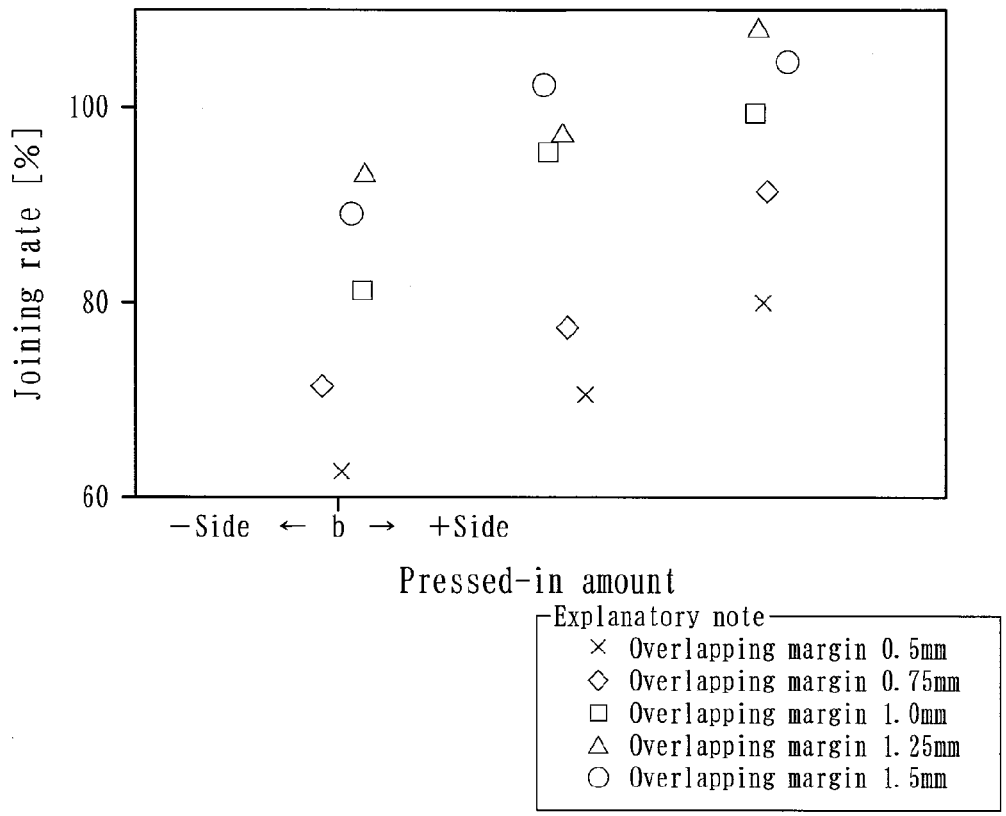
[Fig 8]
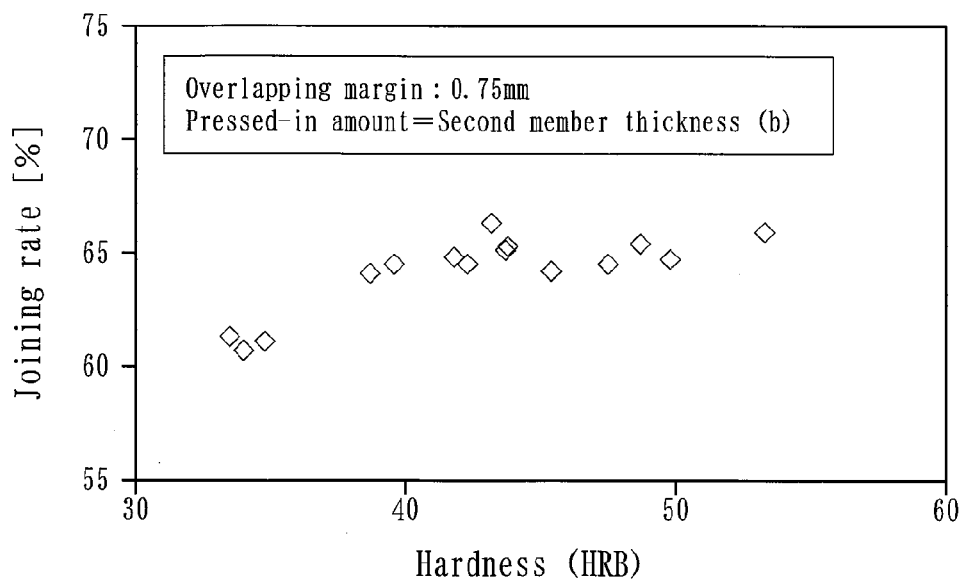

METHOD FOR MANUFACTURING AN INTEGRATED MEMBER AND AN INTEGRATED MEMBER

CROSS-REFERENCE TO RELATED APPLICATIONS

This application is a continuation of PCT Application No. PCT/JP2013/080462, filed on Nov. 11, 2013, which claims priority to Japanese Application No. 2012-255775, filed on Nov. 22, 2012, the entire contents of each of which are hereby incorporated by reference.

FIELD OF THE INVENTIONS

The present inventions relate to integrated members and methods for manufacturing integrated members, by for example, welding a first member formed of aluminum alloy material to a second member formed of ferrous-based material.

DESCRIPTION OF BACKGROUND ART

Some known joining methods for joining, as one example, include integrating aluminum alloy-based materials and ferrous-based materials. In some such known metallurgic joining methods, ferrous-based material is processed with plating film, and filler materials or melting materials different from aluminum or iron are interposed at the joining portion. In these manufacturing methods, it is usually necessary to remove oxide films formed on the aluminum alloy-based material and to use a shielding gas atmosphere or vacuum atmosphere during joining. Additionally, such joining methods typically require a high temperature to be used for a relatively long time for joining.

SUMMARY OF THE INVENTIONS

In the methods for manufacturing integrated members of the prior art mentioned above, since a relatively long time for a high temperature zone is required, there is caused a problem that a fragile middle layer is thickened and thus the joining strength can be reduced. In addition, the necessity for removing oxide film formed on surfaces of the aluminum alloy-base material prior to joining, and for use of shielding gas atmosphere or vacuum atmosphere during joining, presents associated necessary manufacturing costs, that can be reduced or avoided with some embodiments disclosed herein.

It is therefore an object of at least one of the present inventions to provide a method for manufacturing an integrated member and an integrated member manufactured by the method which can improve the joining strength and reduce the manufacturing costs.

Thus, in some embodiments, a method for manufacturing an integrated member by welding a first member formed of aluminum alloy material and a second member formed of ferrous-based material can include using a first member with a predetermined amount of silicon and with a thickness larger than that of the second member. The integration of the first and second members can be performed by pressing the second member against the first member and pressing-in the second member to the first member along the thickness direction of them and by electrically energizing the pressed-in portion of them during the pressing period to perform electric resistance welding. The pressing-in amount can be set to a value larger than the thickness of the second member and less than that of the first member. Additionally, the overlapping margin of the first and second members can be set to a value of 0.5 mm or more.

In some embodiments, the first member can be formed of aluminum alloy die-casting containing silicon of 7.5 to 18.0% by weight.

In some embodiments, the first member can be formed of aluminum alloy casting containing silicon of 6.5 to 13.0% by weight.

In some embodiments, the first member can have a Rockwell hardness of HRB 40 or more.

In some embodiments, a thickness (d) in the thickness direction of the integrated member (W) is smaller than a thickness (a) of the first member (1).

In some embodiments, an integrated member can be formed by welding a first member formed of aluminum alloy material and a second member formed of ferrous-based material characterized in that the first member contains a predetermined amount of silicon and has a thickness larger than that of the second member. The integration of the first and second members can be performed by pressing the second member against the first member and pressing-in the second member to the first member along the thickness direction of them and by electrically energizing the pressed-in portion of them during the pressing period to perform electric resistance welding. The pressing-in amount can be set to a value larger than the thickness of the second member and less than that of the first member. The overlapping margin of the first and second members can be set to a value of 0.5 mm or more.

In some embodiments, the first member can be formed of aluminum alloy die-casting containing silicon of 7.5 to 18.0% by weight.

In some embodiments, the first member can be formed of aluminum alloy casting containing silicon of 6.5 to 13.0% by weight.

In some embodiments, the first member can have a Rockwell hardness of HRB 40 or more.

In some embodiments, a thickness (d) in the thickness direction of the integrated member (W) is smaller than a thickness (a) of the first member (1).

In embodiments were the first member contains a predetermined amount of silicon and has a thickness larger than that of the second member, and where the integration of the first and second members is performed by pressing the second member against the first member and pressing-in the second member to the first member along the thickness direction of them and by electrically energizing the pressed-in portion of them during the pressing period to perform electric resistance welding, and where the pressing-in amount is set to a value larger than the thickness of the second member and less than that of the first member, and where the overlapping margin of the first and second members is set to a value larger than 0.5 mm or more, it is possible to improve the joining strength and reduce the manufacturing cost.

BRIEF DESCRIPTION OF THE DRAWINGS

FIG. 1 is a schematic cross-section view showing a method for manufacturing an integrated member in accordance with an embodiment, before a pressing-in step;

FIG. 2 is a schematic cross-section view showing a method for manufacturing an integrated member, after a pressing-in step;

FIG. 2a is a schematic diagram illustrating an example of a method for manufacturing an integrated member where the component members are annular;

FIG. 2b is a timing diagram illustrating timing of electrical energization during the pressing-in step;

FIG. 3 is a photograph showing a joined portion of the integrated member;

FIG. 4 is an enlarged photograph showing a joined portion of the integrated member;

FIG. 5 is a graph showing a relation between the overlapping margin and the joining rate of the first and second members in manufacture of the integrated member;

FIG. 6 is a graph showing a relation between the pressing-in amount of the second member relative to the first member and the joining rate of the first and second members in manufacture of the integrated member;

FIG. 7 is a graph showing a relation between the pressing-in amount of the first member relative to the second member and the joining rate of the first and second members in manufacture of the integrated member when the overlapping margin is varied; and FIG. 8 is a graph showing a relation between the Rockwell hardness of the first member and the joining rate of the first and second members in manufacture of the integrated member.

DETAILED DESCRIPTION OF EXEMPLIFYING EMBODIMENTS

As shown in FIGS. 1 and 2, an integrated member W of the present embodiment can be formed by welding (different material welding) a first member 1 and a second member 2 comprising two different kinds of metals (e.g., Al material and Fe material). The first member 1 can be formed of aluminum (Al) alloy die-casting and the second member 2 is formed of ferrous (Fe)-based material.

In some embodiments, the thicknesses of the members 1, 2, can be different. For example, in the illustrated embodiment, the first member 1 has a thickness "a" to be joined to the second member 2, the thickness "a" being set larger than a thickness "b" of the second member 2 to be joined to the first member 1. Additionally, the first member 1 can be chamfered on its top corner edge to be joined to the second member 2 and the second member 2 can be similarly chamfered on its bottom corner edge to be joined to the first member 1 so that both the chamfered faces can be opposed each other when the first and second members 1, 2 are integrated. Such chamfering can improve the pressing-in process, described in greater detail below.

With continued reference to FIG. 1, the first member 1 can be secured on a stationary die etc. (not shown) and the second member 2 can be mounted on a movable die etc. with keeping an overlapping margin "c" between the first and second members 1, 2. In other words, the first and second members 1, 2 can be aligned with each other so that they overlap by the distance "c". The overlapping margin "c" can be measured in a direction perpendicular to the moving direction "H" of the second member 2 toward the first member 1. The first member 1 and the second member 2 are adapted to be integrated by pressing the second member 2 against the first member 1 and pressing-in the second member 2 to the first member 1 along the thickness direction of them (direction shown by "H" in FIG. 2) by a predetermined amount and by electrically energizing the pressed-in portion of them during the pressing period to perform the electric resistance welding. As shown in FIG. 2, portions of the first member 1 and/or the second member 2 can be plastically deformed at the area of contact therebetween during the pressing-in.

As shown in FIG. 2a, the first and second members 1, 2 can be annular, the second member 2 fitting inside of the first member 1.

More particularly, a lower electrode (not shown) is connected to the under surface of the first member 1 and an upper electrode (not shown) is connected to the upper surface of the second member 2. Then the second member 2 mounted to the moving die is moved downward (FIG. 2) toward the first member 1 secured on the stationary die and the electric resistance welding is performed by applying a voltage between the upper and lower electrodes during at least part of the pressing period.

Thus an integrated member "W" can be obtained by electrically energizing the pressed-in portion to perform the electric resist welding of the first and second members 1, 2. In this case, the electric energizing of the first and second members 1, 2 may be performed through whole period or any partial period of the pressing process.

With reference to FIG. 2b, the electric energizing of the first and second members 1, 2 can be performed during movement of the second member 2 into the first member 1, for example, during periods "A" and "B" in FIG. 2b. Additionally, as noted above, the electric energizing can be performed for a part of the pressing-in step, for example, stopping at the end of the period "B", such that the electric energizing is not performed during period "C".

Since the integrated member "W" of the present embodiment is electric resistance welded by electrically energizing the pressed-in portion of the first and second portions 1, 2 during the pressing period, the joint boundary is inclined by an angle "e" relative to the pressing direction (downward direction in FIG. 2). The inclination of the joint boundary is preferable for improving the joining rate (%) if the inclination angle "e" is around 10°. The joining rate (%) can be obtained by a following operation formula (the same hereinafter):

$$\text{Joining rate (\%)} = d/b \times 100$$

(herein "d" is a dimension of the joint boundary measured in the thickness direction of the integrated member "W", although the joint boundary itself is inclined along the inclination angle "e").

In FIG. 2, a reference character "f" denotes a portion of material where the electric energizing and pressures during the welding caused each material to melt and plastically deform and to protrude from the jointed portion. Thus, the material "f" can be formed of one or both of the materials forming the members 1 and 2, e.g., a mixture of aluminum (Al) alloy ferrous (Fe)-based materials.

According to the method for manufacturing an integrated member "W" of the present embodiment, it is possible to perform the welding of the first and second members 1, 2 in a short time and a high quality manner and to reduce the cycle time of manufacture and improve the assembling accuracy as compared with welding methods of the prior art such as electron beam welding, plasma welding or TIG welding etc. In some embodiments, the members 1, 2 as well as the joining portion therebetween can have annular shapes. That is, according to an annular electric resistance welding (in the present embodiment, the welding portion is annular), it is possible to perform welding operation in a shorter time than the welding of the prior art mentioned above and thus to perform welding of the first and second members with reducing the total heating amount and suppressing the welding strain.

The first member 1 used in the present embodiment can be formed of aluminum alloy die-casting and can contain a predetermined amount of silicon (Si). For example, the first member 1 can be formed of aluminum alloy die-casting containing silicon (Si) of 7.5 to 18.0% by weight and copper (Cu) of 1.5 to 5.0% by weight and integrated with the second member 2 by pressing-in the second member 2 to the first member 1 and by electrically energizing the pressed-in portion during the pressing period to perform the electric resistance welding. The pressed-in amount "H" is set to a value equal to or larger than the thickness "b" of the second member 2 and less than the thickness "a" of the first member 1. In other words, the pressed-in amount "H" can be considered as a depth to which the second member 2 is pressed into the first member 1. The overlapping margin "c" of the first and second members 1, 2 is set to a value of 0.5 mm or more. Thus, during the pressing-in step, the member 1, 2, contact and interfere with each other.

In addition, the first member 1 can be formed of aluminum alloy die-cast material having a Rockwell hardness of HRB 40 or more, preferably HRB 40 to 50 and the second member 2 can have a Rockwell hardness of preferably HRB 80 to 85. However, materials with other Rockwell hardnesses can also be used, for example, wherein the pressing conditions for manufacturing the integrated member "W" mentioned above can also be satisfied.

After having performed the annular electric resistance welding of the first member 1 formed of aluminum alloy die-casting containing predetermined amounts of silicon (Si) and copper (Cu) and the second member 2 formed of ferrous-based material as described above, a middle layer "α" having a width "k" is formed in the joint boundary of the first and second members 1, 2 as shown in FIGS. 3 and 4. The middle layer "α" can comprise a Al—Fe—Si ternary system compound and its width "k" is comparatively small.

According to the present embodiment, since the middle layer "α" comprising Al—Fe—Si ternary system compound having relatively high strength can be generated in the joint boundary with the use of the first member 1 formed of aluminum alloy die-casting containing predetermined amounts of silicon (Si) and copper (Cu), which can have a higher strength than a fragile middle layer comprising Al—Fe binary system compound, it is possible to improve the joint strength. In addition, since the additive is silicon (Si), it is possible to avoid unnecessary increase of the width "k" of the middle layer "α" even if total heating amount accompanied with the electric resistance welding is increased. In addition, since a predetermined amount of copper (Cu) is added to the first member 1 in addition to silicon (Si), it is possible to promote generation of the middle layer "α" formed of Al—Fe—Si ternary system compound and thus to further improve the joint strength.

Results shown in Table 1 were obtained when performing the annular electric resistance welding described above of the first member 1 formed of aluminum alloy die-casting (samples A1 to A4) or aluminum alloy casting (samples B1 to B3) and the second member 2 formed of ferrous-based material. The samples prepared for the first member 1 formed of aluminum alloy die-casting are: sample A1 containing silicon (Si) of 5.12% by weight, sample A2 containing silicon (Si) of 7.45% by weight, sample A3 containing silicon (Si) of 10.7% by weight, and sample A4 containing silicon (Si) of 18.1% by weight. The samples prepared for the first member 1 formed of aluminum alloy casting are: sample B1 containing silicon (Si) of 4.53% by weight, sample B2 containing silicon (Si) of 6.38% by weight, and sample B3 containing silicon (Si) of 13.2% by weight.

TABLE 1

| Sample | Aluminum alloy die-casting | | | | Aluminum alloy casting | | |
| --- | --- | --- | --- | --- | --- | --- | --- |
| | A1 | A2 | A3 | A4 | B1 | B2 | B3 |
| Si (wt %) | 5.12 | 7.45 | 10.7 | 18.1 | 4.53 | 6.38 | 13.2 |
| Middle layer α | Al—Fe | Al—Fe—Si | Al—Fe—Si | Al—Fe—Si | Al—Fe | Al—Fe—Si | Al—Fe—Si |
| Thickness of middle layer α (max: μm) | 0.36 | 0.25 | 0.3 | 0.29 | 0.38 | 0.32 | 0.35 |

It will be appreciated from Table 1 that in case of the first member 1 formed of aluminum alloy die-casting, a middle layer "α" comprising Al—Fe—Si ternary system compound can be generated when the first member 1 contains silicon around 7.5 to 18.0% by weight and in case of the first member 1 formed of aluminum alloy casting, a middle layer "α" comprising Al—Fe—Si ternary system compound can be generated when the first member 1 contains silicon around 6.5 to 13.0% by weight. In the above noted samples, the thickness of the generated middle layer "α" is 1 μm or less and thus it is believed that the strength can be improved.

Then the method for manufacturing the integrated member of the present embodiment is further described below, with reference to a specific embodiment having specific dimensions and parameters, although other parameters can also be used.

The first member 1 of aluminum alloy die-casting having the thickness (a) of 6 mm was secured on the stationary die and the second member 2 of ferrous-based material having the thickness (b) of 4 mm was mounted on the movable die. A plurality of samples having various overlapping margins (c) between the first and second members 1, 2 were prepared and the electric resistance welding was performed with the pressing-in amount (H) of 4 mm. The Rockwell hardness of the first member 1 was HRB 40 to 50 and that of the second member 2 was HRB 80 to 85.

FIG. 5 is a graph showing a relation between the joining rate (%) and the overlapping margin (mm) as to the members integrated under the welding conditions mentioned above. According to the results of experiment described above, it will be appreciated that the joining rate (%) and the joint strength of the first and second members 1, 2 can be improved by setting the overlapping margin (c) to 0.5 mm or more.

FIG. 6 is a graph showing a relation between the joining rate (%) and the pressed-in amount (H) obtained by measuring the joining rate (%) with setting the overlapping margin (c) to 0.5 mm and 0.75 mm and changing the pressed-in amount (H) of the second member 2 relative to the first member 1 to various values from the thickness of the second member 2. From the results of which, it will be appreciated that the joining rate (%) and the joint strength of the first and second members 1, 2 can be improved by setting the pressed-in amount (H) of the first and second members 1, 2 to values larger than the thickness "b" of the second member 2 when the overlapping margin (c) of the first and second members 1, 2 are 0.5 mm and 0.75 mm.

In addition, FIG. 7 is a graph showing a relation between the joining rate (%) and the pressed-in amount (H) obtained by measuring the joining rate (%) with setting the overlapping margin (c) to 0.5 mm, 0.75 mm, 1.0 mm, 1.25 mm and 1.5 mm and changing the pressed-in amount (H) of the second member 2 relative to the first member 1 to various values from the thickness of the second member 2. From the results of which, it will be appreciated that the joining rate (%) and the joint strength of the first and second members 1, 2 and can be improved by setting the pressed-in amount (H) of the first and second members 1, 2 to values larger than the thickness "b" of the second member 2 when the overlapping margin (c) of the first and second members 1, 2 are 0.5 mm, 0.75 mm, 1.0 mm 1.25 mm and 1.5 mm.

Furthermore, FIG. 8 is a graph showing a relation between the joining rate (%) and the Rockwell hardness (HRB) of the first member 1 obtained by measuring the joining rate (%) with setting the overlapping margin (c) to 0.75 mm as well as setting the pressed-in amount (H) of the second member 2 relative to the first member 1 to the thickness of the second member 2. From the results of which, it will be appreciated that a stable joining rate (%) can be always attained by using the first member 1 having the Rockwell hardness higher than HRB 40.

According to the present embodiment, since it is characterized in that the first member contains a predetermined amount of silicon and has a thickness larger than that of the second member; that the integration of the first and second members is performed by pressing the second member against the first member and pressing-in the second member to the first member along the thickness direction of them and by electrically energizing the pressed-in portion of them during the pressing period to perform the electric resistance welding; that the pressing-in amount is set to a value larger than the thickness of the second member and less than that of the first member; and that the overlapping margin of the first and second members is set to a value of 0.5 mm or more, it is possible to improve the joining strength and reduce the manufacturing cost.

More particularly, since the aluminum alloy die-casting forming the first member contains a predetermined amount of silicon (Si) or copper (Cu) and the integration of the first and second members 1, 2 is performed by pressing the second member 2 against the first member 1 and pressing-in the second member 2 to the first member 1 and by electrically energizing the pressed-in portion of them during the pressing period to perform the electric resistance welding, it is possible to reduce the width "k" of the middle layer "α" generated in the joint boundary and make the middle layer "α" the Al—Fe—Si ternary system compound having relatively high strength to improve the joint strength.

In addition, according to the present embodiment, since the electric resistance welding is performed by electrically energizing the pressed-in portion of the first member 1 and the second member 2, oxide films on the surface of the pressed-in portion of the first member 1 can be removed during the press-in process and thus excellent welding can be attained without disturbing the element diffusion necessary for welding. Thus, it is possible to eliminate any separate step for removing the oxide films and make shielding gas atmosphere or vacuum atmosphere unnecessary during welding process to reduce the manufacturing cost.

Furthermore, since the welding of the first and second members 1, 2 is performed by pressing-in the second member 2 relative to the first member 1 and by electrically energizing the pressed-in portion of them during the pressing period to perform the electric resistance welding, the joint boundary is inclined relative to the joining direction (see FIG. 2 to FIG. 4). This increases the joining rate of the first and second members 1, 2 and thus improves the joining strength. In addition, since the welding of the first and second members 1, 2 is performed by pressing-in the second member 2 and by electrically energizing the pressed-in portion of them during the pressing period to perform the electric resistance welding, it is possible to reduce the welding time duration and thus to suppress generation of the middle layer "a" due to reduction of time duration of high temperature zone and to improve the joining strength.

The present inventions have been described with reference to the preferred embodiments described above. However, the present inventions are not limited to the illustrated and described embodiments. For example, the first member 1 may be aluminum alloy casting in place of aluminum alloy die-casting and in this case it is preferable to use a member containing silicon of 6.5 to 13.0% by weight. In addition, although it is preferable that the first and second members 1, 2 are members having hardness described above, members having different hardness may be used. However, it is preferable that the first member 1 has the hardness of HRB 40 or more. Furthermore, although it has been described that the first member 1 of the present embodiment contains copper (Cu) of 1.5 to 5.0% by weight, other first member containing other amount of copper or containing no copper may be used.

The present inventions can be applied to integrated members and method for manufacturing the same, although they have different appearance or other additional functions, characterized in that the first member contains a predetermined amount of silicon and has a thickness larger than that of the second member; that the integration of the first and second members is performed by pressing the second member against the first member and pressing-in the second member to the first member along the thickness direction of them and by electrically energizing the pressed-in portion of them during the pressing period to perform the electric resistance welding; that the pressing-in amount is set to a value larger than the thickness of the second member and less than that of the first member; and that the overlapping margin of the first and second members is set to a value of 0.5 mm or more.

What is claimed is:

1. A method for manufacturing an integrated member by welding a first member formed of aluminum alloy material and a second member formed of ferrous-based material characterized in:

that the first member contains a predetermined amount of silicon and has a thickness larger than that of the second member;

that the integration of the first and second members is performed by pressing the second member against the first member and pressing-in the second member to the first member along the thickness direction of them and by electrically energizing the pressed-in portion of them during at least a portion of the pressing period to perform electric resistance welding;

that the pressing-in amount is set to a value larger than the thickness of the second member and less than that of the first member; and that the overlapping margin of the first and second members is set to a value of 0.5 mm or more.

2. The method for manufacturing an integrated member of claim 1 wherein the first member is formed of aluminum alloy die-casting containing silicon of 7.5 to 18.0% by weight.

3. The method for manufacturing an integrated member of claim 1 wherein the first member is formed of aluminum alloy casting containing silicon of 6.5 to 13.0% by weight.

4. The method for manufacturing an integrated member of claim 1 wherein the first member has the Rockwell hardness of HRB 40 or more.

5. The method for manufacturing an integrated member of claim 1 wherein a thickness in the thickness direction of the integrated member is smaller than a thickness of the first member.

6. An integrated member formed by welding a first member formed of aluminum alloy material and a second member formed of ferrous-based material characterized in:
that the first member contains a predetermined amount of silicon and has a thickness larger than that of the second member;
that the integration of the first and second members is performed by pressing the second member against the first member and pressing-in the second member to the first member along the thickness direction of them and by electrically energizing the pressed-in portion of them during the pressing period to perform electric resistance welding;
that the pressing-in amount is set to a value larger than the thickness of the second member and less than that of the first member; and
that the overlapping margin of the first and second members is set to a value of 0.5 mm or more.

7. The integrated member of claim 6, wherein the first member is formed of aluminum alloy die-casting containing silicon of 7.5 to 18.0% by weight.

8. The integrated member of claim 6, wherein the first member is formed of aluminum alloy casting containing silicon of 6.5 to 13.0% by weight.

9. The integrated member of claim 6, wherein the first member has the Rockwell hardness of HRB 40 or more.

10. The integrated member of claim 6, wherein a thickness in the thickness direction of the integrated member is smaller than a thickness of the first member.

11. A method for manufacturing an integrated member by welding a first member formed of aluminum alloy material and a second member formed of ferrous-based material, the method comprising:
aligning the first and second members with an overlapping margin of 0.5 mm or more;
pressing the second member, which comprises the ferrous-based material, against the first member, which comprises the aluminum alloy with a predetermined amount of silicon and a thickness larger than that of the second member, along a thickness direction of the first and second members such that the first and second members contact at pressed-in portions of the first and second members;
electrically energizing the pressed-in portions of the first and second members during at least a portion of the step of pressing the second member, thereby electric resistance welding the first member to the second member; and
pressing the second member against the first member until the second member is pressed into the first member by a pressing-in distance that larger than the thickness of the second member and less than a thickness of the first member.

12. The method for manufacturing an integrated member of claim 11 wherein the first member is formed of aluminum alloy die-casting containing silicon of 7.5 to 18.0% by weight.

13. The method for manufacturing an integrated member of claim 11 wherein the first member is formed of aluminum alloy casting containing silicon of 6.5 to 13.0% by weight.

14. The method for manufacturing an integrated member of claim 11, wherein the first member has the Rockwell hardness of HRB 40 or more.

15. The method for manufacturing an integrated member of claim 11, wherein a thickness in the thickness direction of the integrated member is smaller than a thickness of the first member.

16. An integrated member formed by welding a first member formed of aluminum alloy material and a second member formed of ferrous-based material, comprising:
a first member comprising a predetermined amount of silicon and having a first thickness;
a second member comprising a ferrous-based material and having a second thickness, the first thickness being larger than the second thickness;
wherein first and second members are integrated by pressing the second member against the first member and pressing-in the second member to the first member along the thickness direction of them and by electrically energizing the first and second members during pressing to thereby weld the first and second members together with electric resistance welding;
wherein the first member is pressed into the second member to depth larger than the second thickness and less than the first thickness; and
that the overlapping margin of the first and second members is set to a value of 0.5 mm or more.

17. The integrated member of claim 16, wherein the first member is formed of aluminum alloy die-casting containing silicon of 7.5 to 18.0% by weight.

18. The integrated member of claim 16, wherein the first member is formed of aluminum alloy casting containing silicon of 6.5 to 13.0% by weight.

19. The integrated member of claim 16, wherein the first member has the Rockwell hardness of HRB 40 or more.

20. The integrated member of claim 16, wherein a thickness in the thickness direction of the integrated member is smaller than a thickness of the first member.

* * * * *

UNITED STATES PATENT AND TRADEMARK OFFICE
CERTIFICATE OF CORRECTION

PATENT NO. : 9,987,704 B2
APPLICATION NO. : 14/720313
DATED : June 5, 2018
INVENTOR(S) : Yasuyuki Doi It is certified that error appears in the above-identified patent and that said Letters Patent is hereby corrected as shown below:

In the Specification

In Column 8 at Line 18, Change ""a"" to --"α"--.

In the Claims

In Column 10 at Line 11 (approx.), in Claim 11, after "distance" delete "that".

Signed and Sealed this
Fourth Day of December, 2018

Andrei Iancu
*Director of the United States Patent and Trademark Office*